United States Patent [19]
Tsang et al.

[11] Patent Number: 5,613,123
[45] Date of Patent: *Mar. 18, 1997

[54] METHOD AND SYSTEM FOR CONFIGURING AND EXECUTING DEVICE DRIVERS BASED ON CONFIGURATION REQUIREMENTS

[75] Inventors: Michael H. Tsang, Renton; Andrew P. R. Crick, Woodinville, both of Wash.

[73] Assignee: Microsoft Corporation, Redmond, Wash.

[ * ] Notice: The term of this patent shall not extend beyond the expiration date of Pat. No. 5,432,941.

[21] Appl. No.: 444,218

[22] Filed: May 18, 1995

Related U.S. Application Data

[63] Continuation of Ser. No. 954,677, Sep. 30, 1992, abandoned.

[51] Int. Cl.$^6$ ............................................. G06F 13/10
[52] U.S. Cl. ................................... 395/651; 395/681
[58] Field of Search ....................................... 395/700

[56] References Cited

U.S. PATENT DOCUMENTS

| | | | |
|---|---|---|---|
| 4,589,063 | 5/1986 | Shah et al. | 395/275 |
| 4,649,479 | 3/1987 | Advani et al. | 364/700 |
| 5,179,666 | 1/1993 | Rimmer et al. | 395/275 |
| 5,291,585 | 3/1994 | Sato et al. | 395/700 |
| 5,339,432 | 8/1994 | Crick | 395/700 |
| 5,432,941 | 7/1995 | Crick et al. | 395/700 |

Primary Examiner—Kevin A. Kriess
Assistant Examiner—John Q. Chavis
Attorney, Agent, or Firm—Seed and Berry LLP

[57] ABSTRACT

A method and system for configuring and executing device drivers in a computer system. In a preferred embodiment, a device driver comprises a plurality of component drivers. Each component driver performs a function that may be used in accessing a device. The component drivers of a device driver are ordered from a top layer to a bottom layer. When accessing a device, the top layer component driver of the device driver is first invoked. Each component driver performs its function and invokes the next lower layer component driver to the bottom layer component driver, which interacts directly with the device. An operating system dynamically configures the device drivers at computer system startup. The operating system invokes each of a plurality of component drivers to determine based on device-specific information and configuration requirements of previously included component drivers whether the component driver should be selected to be included as a layer in a particular device driver. If selected, the component driver stores a reference to itself in a call-down table for the device driver and stores its configuration requirements with the unsatisfied configuration requirements of previously included component drivers. When accessing the device, if all configuration requirements for the device driver have been satisfied, the operating system first invokes the component driver referenced by the top reference in the call-down table. Each component driver in turn invokes the component driver referenced by the next lower reference in the call-down table.

41 Claims, 13 Drawing Sheets

METHOD AND SYSTEM FOR CONFIGURING AND EXECUTING DEVICE DRIVERS BASED ON CONFIGURATION REQUIREMENTS

CROSS-REFERENCE TO RELATED APPLICATION

This application is a continuation of U.S. patent application Ser. No. 07/954,677, filed Sep. 30, 1992, now abandoned.

TECHNICAL FIELD

The present invention relates generally to the field of device drivers and, more particularly, to a method and system for configuring and executing device drivers.

BACKGROUND OF THE INVENTION

A computer system typically is connected to various peripheral devices, which may include disk drives, tape drives, printers, and modems. The computer system has an operating system that provides an interface between an application program and these devices. The operating system receives from the application program a request to access one of the devices and translates this request into a request that will be understandable by that device. The operating system sends the translated request to the device and typically informs the application program when the requested access is complete.

The portion of the operating system that translates a request to access a device and controls communications with that device is typically referred to as a device driver. For example, an application program may request the operating system to read a file stored on a disk drive. The operating system would invoke a device driver provided for the disk drive and send the device driver this read request. The disk device driver would translate the read request by determining the actual disk location at which the file is stored, and would send the read request to the disk drive. The disk drive would then service the read request by reading the disk at the determined actual disk location, and then inform the device driver upon completion. The device driver would then inform the application program that the request has been serviced.

FIG. 1 is a block diagram illustrating the prior art use of a device driver in a computer system. The computer system comprises a computer 100 and a plurality of devices 113, 114, 115. The computer 100 includes a memory loaded with various application programs 101 and an operating system 102. The application programs 101 request services of the devices through the operating system 102. The operating system 102 receives such a request and invokes an appropriate device driver 103, 104, 105 to service the request. The device driver 103, 104, 105 then translates the request and sends it to the device 113, 114, 115, respectively. It should be noted that, although a device driver can correspond to any number of devices, only one device for each device driver is shown for simplicity of explanation.

Prior device drivers typically have been developed by the manufacturer of each corresponding device. The developer of the operating system typically publishes a specification of the interface between the operating system and a device driver. The manufacturer of the device then develops the device driver necessary to communicate with its corresponding device using this specification. The manufacturer then distributes the device driver to its customers.

After developing the device driver, the manufacturer of the device will often add various features to the device driver to enhance the marketability of the device. For example, a manufacturer of a disk drive may provide a device driver with data compression, data encryption, or disk caching options. Unfortunately, as more options are added to the device driver, the device driver becomes more complex. As the complexity of a device driver increases, the more difficult it becomes for a manufacturer to modify and test the device driver. For example, the addition of data compression, data encryption or disk caching typically requires changes to be made throughout the device driver code in order to accommodate these options.

An additional problem is that the complexity of distributing device drivers increases when the device manufacturer integrates third party software into its device driver. For example, if a third party develops a particularly efficient data compression program, the third party developer may sell the program to various device manufacturers. Each manufacturer would then integrate the data compression program into its own device driver. Once the integration is complete, each manufacturer would then distribute its new device driver directly to its customers or indirectly through the operating system developer when a new version of the operating system is released.

SUMMARY OF THE INVENTION

It is an object of the present invention to provide a method and system in which a device driver is dynamically configured.

It is another object of the present invention to provide a method and system for organizing a device driver into layers of component drivers, each of which imposes configuration requirements during configuration of the device driver.

It is another object of the present invention to provide a method and system for configuring a device driver based on configuration requirements of component drivers which compose the device driver.

It is another object of the present invention to provide a method and system in which a device driver can be configured to include new features without the need for the device manufacturer to integrate the new features.

It is another object of the present invention to provide a method and system in which new features developed by third parties can be dynamically configured into a device driver.

It is another object of the present invention to provide a method and system for configuring a device driver based on configuration requirements of new features provided.

It is another object of the present invention to provide a method and system wherein access to a device is allowed only when all configuration requirements of the device driver have been satisfied.

These and other objects, which will become apparent as the invention is more fully described below, are obtained by a method and system for configuring a device driver described as follows. In a preferred embodiment, the device driver is organized in layers of component drivers that each perform a function (e.g., disk caching) used in accessing a device. When accessing a device, a top layer component driver of the device driver is first invoked. Each component driver performs its function and potentially invokes a next lower layer component driver down to a bottom layer component driver.

A device driver is configured by first selecting a component driver to be included as the bottom layer and continuing to select higher level component drivers until the top layer component driver is included. In a preferred embodiment, at computer startup or restart, the operating system invokes each component driver to determine whether to select the component driver to be included as a layer in the device driver. Each component driver is or is not selected according to existing device-specific information based on characteristics of the device and, in some cases, based on configuration requirements of component drivers previously included as lower layers. Each selected component driver indicates those configuration requirements that it satisfies, and indicates any configuration requirements to be imposed on component drivers yet to be included as higher layers.

When a component driver is selected, it stores a reference to itself in a call-down table for the device driver. The call-down table stores the order in which the selected component drivers are invoked. When accessing a device, the operating system first invokes the component driver identified by the top reference in the call-down table for that device. Each component driver in turn potentially invokes the component driver identified by the next lower reference in the call-down table. The component drivers identified in the call-down table are typically only invoked to perform the device access if all configuration requirements have been met in configuring the device driver.

DETAILED DESCRIPTION OF THE INVENTION

The present invention configures a device driver by selecting appropriate component drivers to be included as layers in the device driver. During configuration, starting with a bottom layer and continuing to a top layer, each component driver is selected or not selected based on device-specific information and potentially based on configuration requirements of previously included lower layer component drivers.

Each selected component driver indicates configuration requirements that must be satisfied by higher layers. Each component driver also indicates lower layers' configuration requirements that it satisfies. When an application program requests access to a device, the selected component drivers are invoked to perform the device access only if all of these configuration requirements have been satisfied.

As an example, a component driver that requires physical disk addressing (e.g. sector number) would indicate a configuration requirement corresponding to the physical disk addressing. If a selected component driver satisfies the physical disk addressing configuration requirement, then it would indicate that the requirement has been satisfied. If no component drivers so indicate during configuration of the device driver, the configuration requirement for physical disk addressing remains unsatisfied and access to the device related to the resulting device driver will not be granted to an application program.

Figure 1:
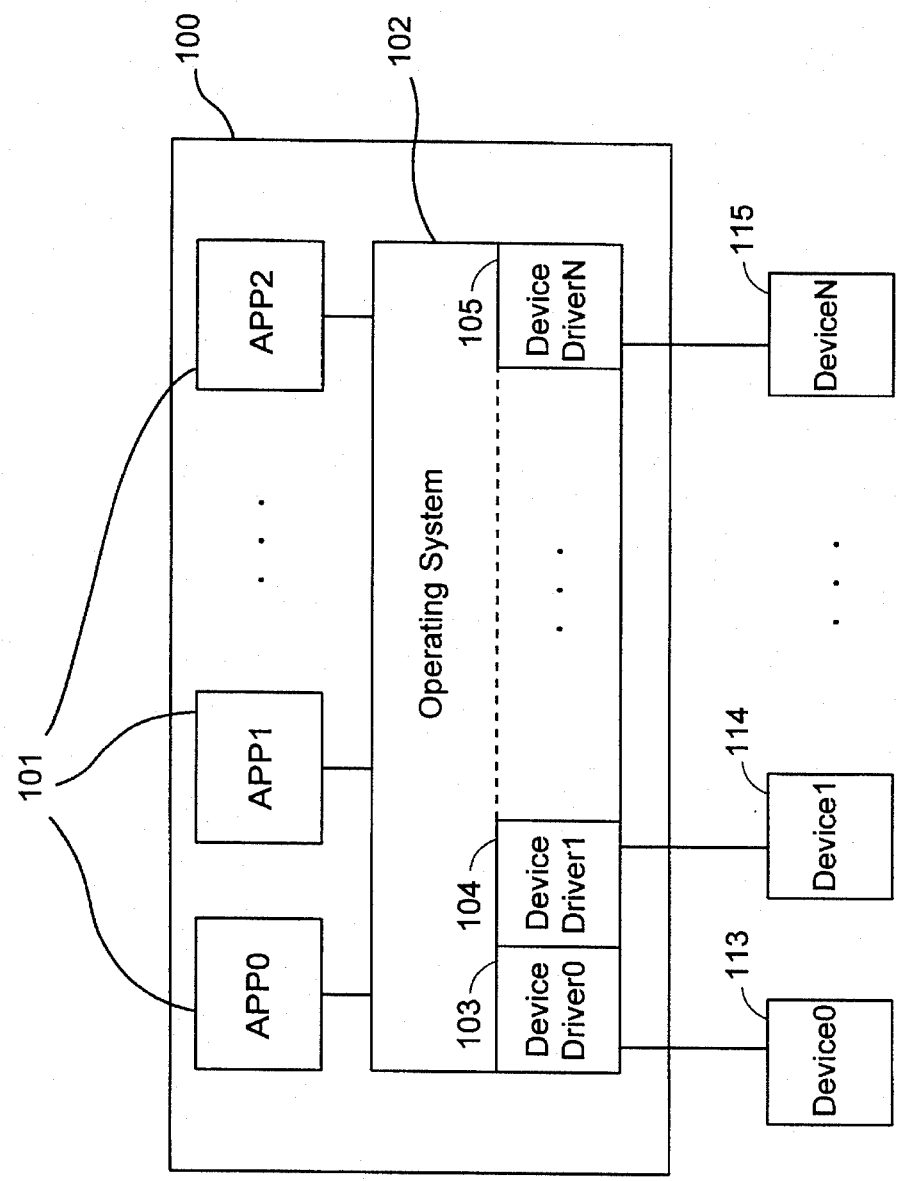
FIG. 1 is a block diagram illustrating the prior art use of a device driver in a computer system.
Figure 2:
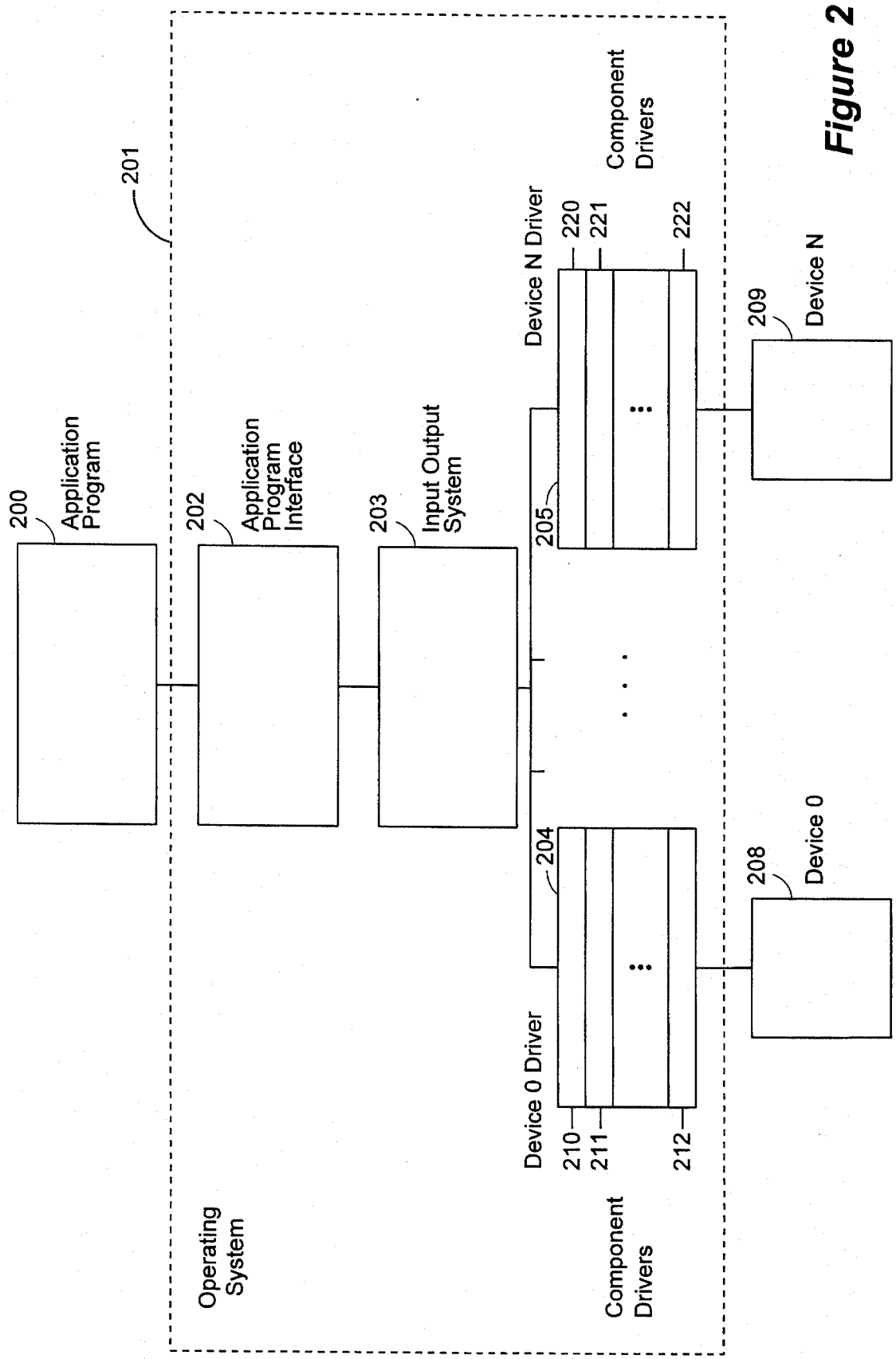
FIG. 2 is a block diagram illustrating components of the present invention.

FIG. 2 is a block diagram illustrating components of a computer system having device drivers configured during startup or restart in accordance with the present invention. As a result of this configuration, the computer system in FIG. 2 functions as follows. An application program 200 formulates Input/Output (I/O) requests and passes the requests to the operating system 201 through an application program interface 202. The application program interface 202 provides the application program 200 with access to the operating system 201. It should be noted that application programming interfaces are well known in the computer field, and are specific to the operating system associated therewith. When the application program interface 202 receives an I/O request, it invokes the input-output system (IOS), passing it the request.

The input-output system determines which device driver 204, 205 can service the request depending on which device 208, 209 is identified in the request. Device driver 204 comprises component drivers 210 and 211 through 212, and device driver 205 comprises component drivers 220 and 221 through 222. Within the device drivers, the component drivers 210 and 220 are the top layers and component drivers 212 and 222 are the bottom layers. Upon receiving the I/O request, if all configuration requirements have been satisfied in configuring the device driver for the requested device, the component drivers in the device driver are invoked and passed the I/O request. Initially, the input-output system invokes the top layer component driver, passing it the request. The top layer component driver performs component driver specific functions and invokes when appropriate the next lower layer component driver, passing it the request. The next lower layer component driver performs its own component driver specific functions and invokes when appropriate the next lower layer component driver, passing it the request, and so on. Finally, the bottom layer component driver interacts with the peripheral device, typically through a device adapter (not shown). Device adapters are well known in the computer field for interfacing between a computer system and a peripheral device.

Figure 3:
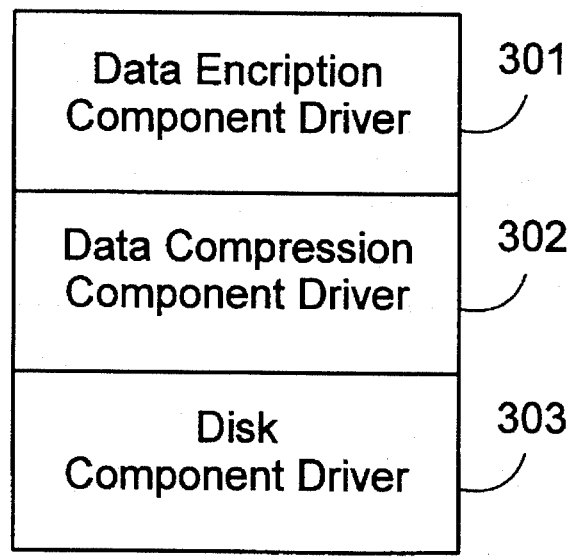
FIG. 3 is a block diagram showing a sample disk drive device driver.

FIG. 3 is a block diagram showing a sample disk drive device driver that is configured by the present invention. The disk drive device driver would be configured by the present invention as, for example, the device driver 204 if the device 208 were a disk drive. The disk drive device driver is implemented to perform synchronous I/O includes as component drivers which satisfy the configuration requirements of the disk drive, a data encryption component driver 301, a data compression component driver 302, and a disk component driver 303. The data encryption component driver encrypts or decrypts data and passes requests to the data compression component driver. The data compression component driver 302 works in an analogous manner to the data encryption component driver. That is, the data compression component driver compresses or decompresses data and passes the request along to the disk component driver. The disk component driver controls the reading and writing of the data to the disk drive through a disk drive adapter.

Upon receiving a write request to access the disk drive, for example, the IOS invokes the data encryption component driver, passing it the request to write data.

When requested to write data, the data encryption component driver encrypts the data and then invokes the data compression component driver, passing it the write request along with the encrypted data. The data compression component driver compresses the encrypted data and then invokes the disk component driver, passing it the write request along width the compressed data. In the case of the write request, the disk component driver 303 controls the disk drive to write the data to the disk. Upon completion, the component drivers each return control to the next higher layer component driver, and the top layer component driver returns to the IOS.

Figure 4:
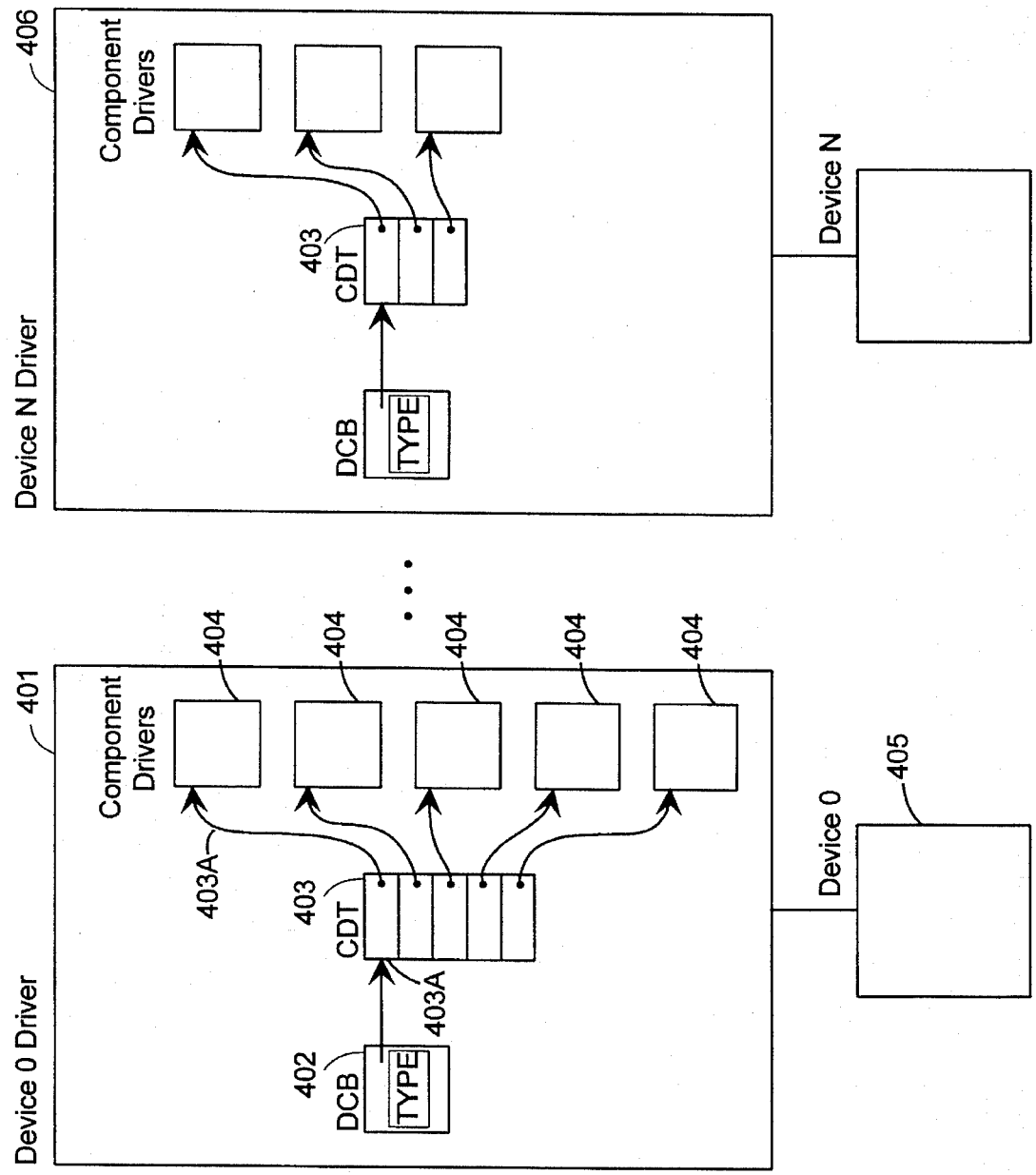
FIG. 4 is a block diagram illustrating the data structures that support the selection and configuring of component drivers.
Figure 5:
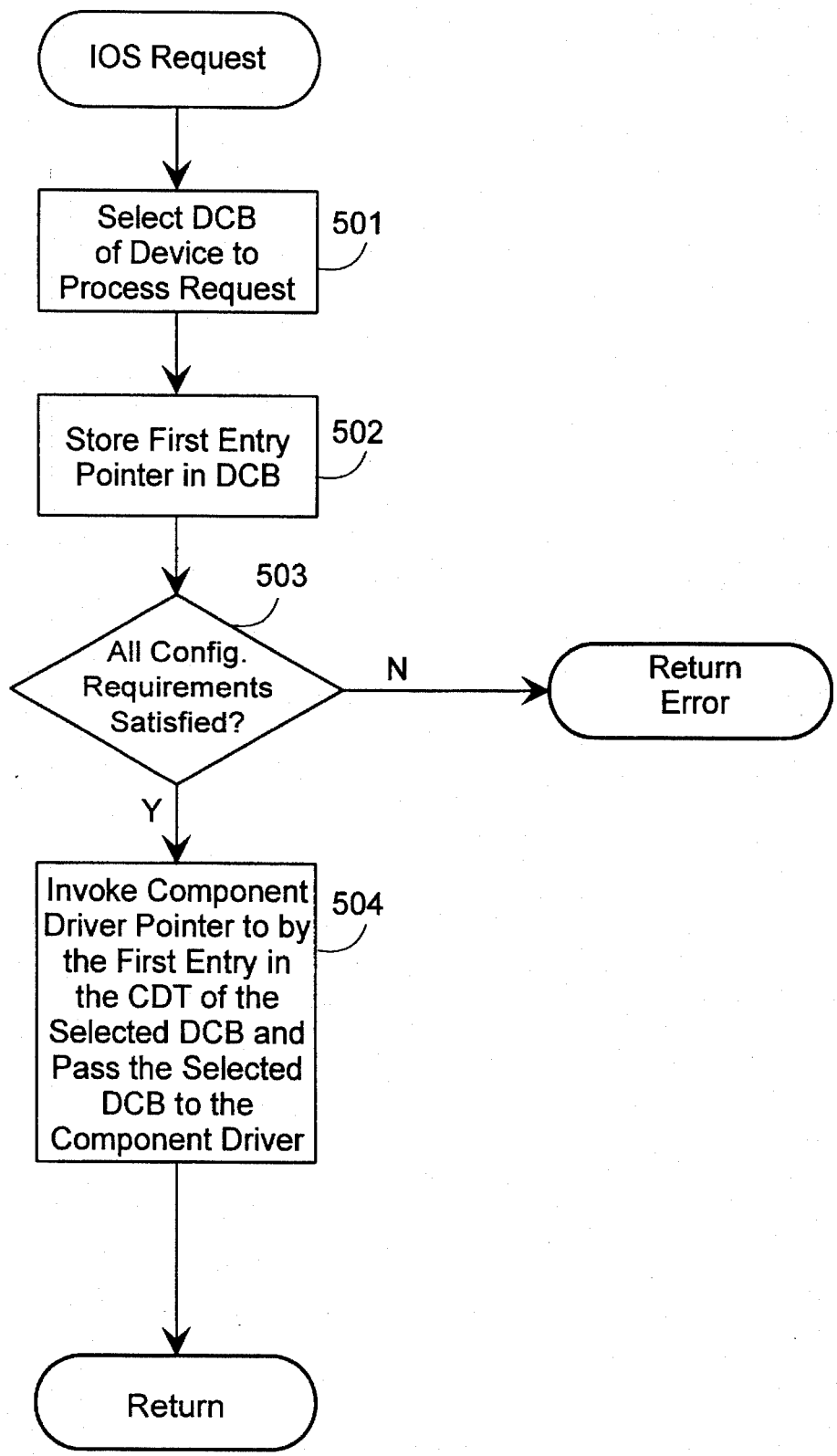
FIG. 5 is a flow diagram of the request routine performed by the Input/Output System in the present invention.
Figure 6:
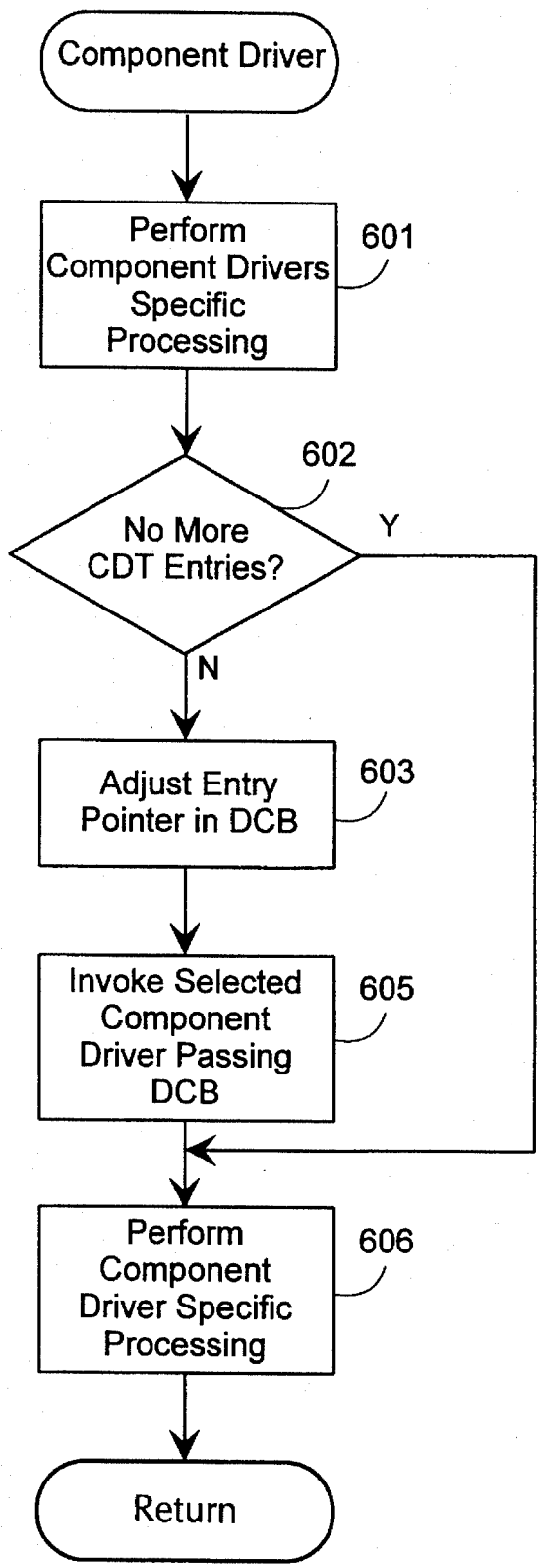
FIG. 6 is a flow diagram of the execution of a sample component driver.

FIGS. 4, 5 and 6 illustrate the operation of the present invention once each device driver is configured to include the selected component drivers. Although configuration of device drivers will be described presently in detail with reference to FIGS. 7, 9, 11A and 11B, FIGS. 4, 5 and 6 and the discussion thereof are directed to execution of device drivers to process I/O requests, and based on the assumption that the device drivers have already been configured to include the selected component devices.

FIG. 4 is a block diagram illustrating the data structures that support the layering of component drivers in a device driver. Device driver 401 contains a device control block (DCB) 402, a call-down table (CDT) 403, and a plurality of component drivers 404. Device driver 401 corresponds to a device 405. In a preferred embodiment of the invention, the device control block 402 contains, as device-specific information, device-type information indicating the type of the device 405 (disk drive, tape drive, printer, modem, etc.), a pointer to the call-down table 403 and a pointer that will point to each entry in the call-down table as the component driver identified by the entry is invoked. The call-down table 403 contains entries that have pointers 403A that point to the component drivers 404 of the device driver 401. As will be explained below in detail, each entry in the call-down table contains configuration requirements. In an embodiment of the present invention, multiple devices and corresponding device drivers are provided which have a similar data structure as shown by device driver 406 and device 407. Each of the component drivers 404 is potentially available as a layer in any of the device drivers provided resulting in the sharing of component drivers between device drivers.

The call-down table 403 specifies the order in which the component drivers, once configured by the present invention as layers in the device driver, are executed to process an I/O request. The top (first) entry in the call-down table points to the top (first) layer component driver. The second entry in the call-down table points to the second layer component driver, and so on. Each layer component driver invokes the next lower layer component driver. Thus, once the IOS invokes the top layer component driver, the layer component drivers control the execution of the device driver.

The IOS invokes a device driver by retrieving the device control block for the device, retrieving the pointer to the call-down table from the device control block, retrieving the top entry from the call-down table, storing in the device control block an entry pointer that points to the top entry in the call-down table, and invoking the top layer component driver. A component driver uses the entry pointer stored in the device control block to determine which component driver is at the next lower layer. Each component driver adjusts the entry pointer in the device control block to point to the call-down table entry for the next lower component driver and then invokes that component driver. The bottom layer component driver invokes no component driver, but rather interacts with the device directly.

FIG. 5 is a flow diagram of the IOS request routine that processes requests from the application programming interface. The IOS request routine receives as input an I/O request, determines which device driver should be invoked, and invokes the first component driver of the device driver. In step 501, the IOS routine selects the device control block corresponding to the device driver that is to process the request. In step 502, the IOS routine stores in the selected device control block an entry pointer to the first entry of the call-down table related to the selected device control block. The storing of this entry pointer allows the first component driver to determine its corresponding entry in the call-down table for the selected device driver via the device control block. In step 503, if access to the device is allowed, then the IOS routine continues at step 504, else the IOS routines returns an indication that the I/O request cannot be satisfied. As described below in detail, an I/O request can be satisfied only when all the configuration requirements of the component drivers have been satisfied. In step 504, the IOS routine invokes the component driver pointed to by the first entry in the call-down table related to the selected device control block, passing the component driver the selected device control block. The IOS routine then returns.

FIG. 6 is a flow diagram of the execution of a sample component driver when invoked. Generally, the component driver performs its component driver specific functions (e.g., data encryption and data decryption) and invokes the component driver pointed to by the next call-down table entry. Specifically, the component driver is passed the device control block. In step 601, the component driver performs component driver specific processing (e.g., data encryption and data compression) that is appropriate before invoking the next lower layer component driver. In step 602, if the entry pointer in the device control block points to the last entry in the call-down table, then this component driver is the bottom layer component driver and the component driver continues at step 606, else the component driver continues at step 603. In step 603, the component driver adjusts the entry pointer in the device control block to point to the entry for the next component driver. The entry is obtained from the call-down table by retrieving the next component driver pointer 403A. In step 605, the component driver invokes the next lower component driver, passing it the device control block. In step 606, after the next lower component driver returns, the component driver performs component driver specific processing that is appropriate after return of the next lower layer component driver (e.g. data decompression or data decryption). The component driver then returns.

Figure 7:
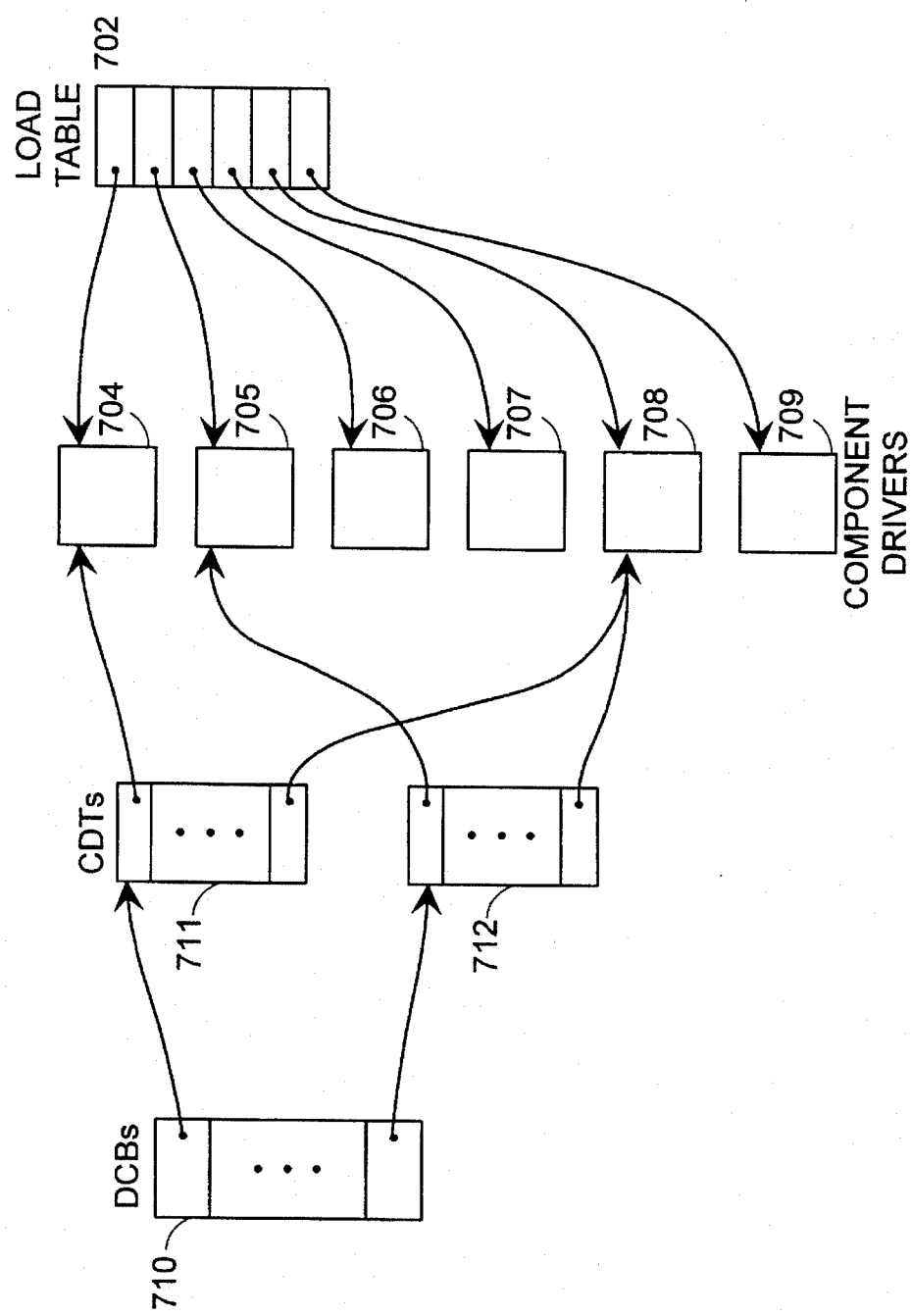
FIG. 7 is a block diagram illustrating how the driver configuration routine is performed by the Input/Output System in the present invention.

A preferred embodiment of the present invention dynamically configures a device driver at computer startup. FIG. 7 is a block diagram illustrating the driver configuration process of the IOS. At computer startup, the operating system invokes a driver configuration routine that is part of the IOS. The driver configuration routine inputs (typically from a storage device) a load table 702 and creates and initializes a device control block and a call-down table for the device. The load table 702 contains a list of pointers to component drivers 704–709 that are available to be configured into device drivers. The driver configuration routine scans the load table and loads into memory each component driver in order, starting with the component driver pointed to by the last load table entry. In a preferred embodiment, a component driver is selected for inclusion into the device driver by allowing the component driver itself to determine whether to be included based on the configuration requirements and device-type information. Once a component driver is loaded, the configuration routine invokes the component driver to determine whether it should be included in the call-down table for the device driver. If the component driver determines that it should be included, then the component driver includes itself into call-down table 711 by inserting a pointer to itself in the call-down table. The call-down table functions as a stack in that new entries are pushed onto the top of the call-down table and existing entries are pushed down. In a preferred embodiment, when multiple device drivers are to be configured, the configuration routine invokes each component driver once for each device driver, in the fashion described above.

Figure 8:
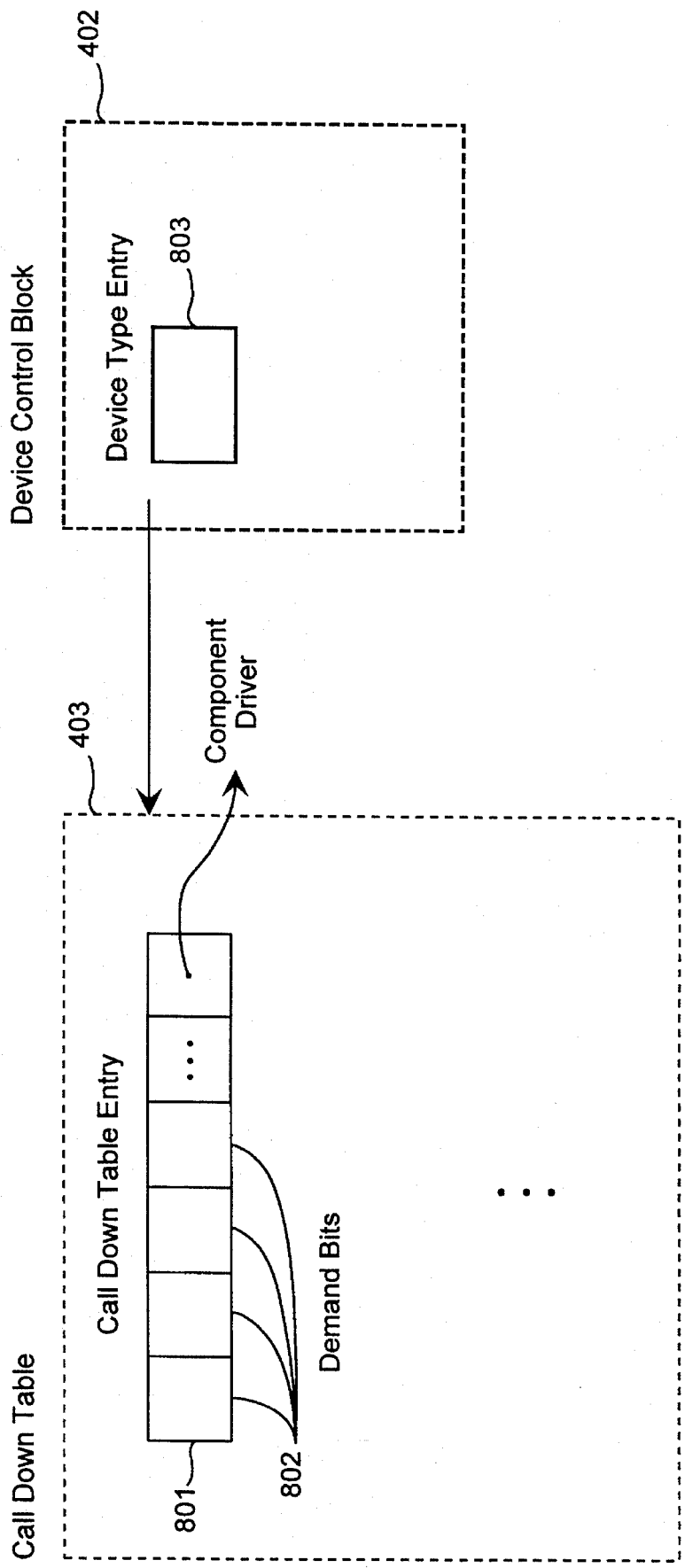
FIG. 8 is a block diagram showing a call-down table entry in the call-down table and a device-type entry in the device control block.

FIG. 8 is a block diagram illustrating sample configuration requirements and device-type information used in dynamically configuring a device driver by selecting component drivers as layers. In a preferred embodiment, each component driver itself performs this selection by determining whether it should be linked into the call-down table based on device-type information stored in the device control block, and based on configuration requirements stored in the call-down table.

A component driver uses device-specific information in determining whether to link into the call-down table. In a preferred embodiment, a device control block 402 stores device-type information in a device-type entry 803 which indicates a device-type of the corresponding device. For example, for a disk drive the entry would be "0", for a tape drive the entry would be "1", for a printer the entry would be "2", and so on. When determining whether to be included in the device driver, a component driver examines the device-type entry in the device control block and inserts itself into the call-down table as appropriate, based on the device-type entry. For example, a component driver that provides disk caching would only insert a pointer to itself into a call-down table for a disk device driver as indicated by a device-type entry of "0".

A component driver may also use configuration requirements when determining whether to link into a call-down table. Each call-down table entry 801 in the call-down table 403 contains demand bits 802 which indicate the configuration requirements of a corresponding component driver loaded into the CDT. These configuration requirements may include logical disk addressing requirements (e.g. file name) or physical disk addressing requirements (e.g. start sector), logical memory addressing requirements (e.g. segment selector and offset) or physical memory addressing requirements, alignment requirements (e.g. word boundary), CPU requirements (e.g. 80386 required), etc. Each demand bit 802 represents a configuration requirement imposed or not imposed upon higher layers in the device driver by the corresponding component driver. For any given IOS, the device driver manufacturer knows the meaning of the demand bits in the entries. When a demand bit 802 is set to "1" the corresponding configuration requirement is imposed, and when cleared to "0" the corresponding configuration requirement is not imposed. For example, a component driver that provides disk caching would require physical disk addressing to be provided by a higher layer in the device driver, such that the disk caching driver could reference the actual physical location of disk data to be cached. Thus, a particular demand bit 802 indicating a physical disk addressing requirement would be set to "1" to impose this requirement on higher layers within the device driver. During configuration, an invoked component driver examines the device configuration requirements and device-type information in the topmost entry in the call-down table and links into the call-down table as appropriate, storing the demand bits in a new topmost entry and clearing the demand bits that it satisfied.

Figure 9:
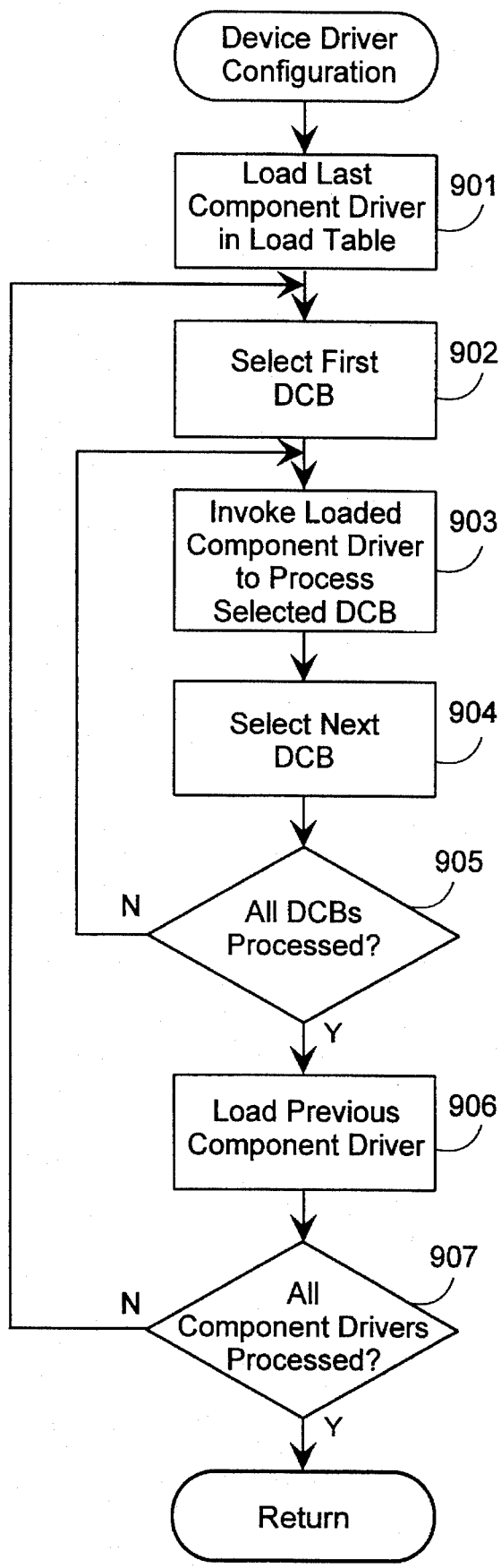
FIG. 9 is a flow diagram of a device driver configuration routine.

FIG. 9 is a flow diagram of a device driver configuration routine performed by the IOS. For each component driver in the load table, the device driver configuration routine loads the component driver, passing it the device control block for each device. The component driver determines, based on the device-type information and the configuration requirements, whether it should be included in each device driver and, if so, pushes an entry with a pointer to itself onto the call-down table. The component drivers pointed to by the call-down table are invoked when access to the corresponding device is later requested.

In step 901, the routine selects the component driver pointed to by the last entry in the load table. In a preferred embodiment, the load table is arranged so that component drivers that should be linked as lower layers are towards the end of the load table and, thus, would be loaded first. In steps 902 through 907, the routine loops, loading each remaining component driver in the load table. In step 902, the routine selects the device control block for the first device. In steps 903 through 905, the routine loops, invoking the loaded component driver once for each device, passing it the device control block for that device. One skilled in the art would appreciate that a component driver may have two entry points. One entry point would be used during device configuration and would be pointed to by the load table. The other entry point would be used during device access and would be pointed to by the call-down table entries for that component driver. Alternatively, each component driver would have only one entry point and be passed a parameter indicating whether it is being invoked for configuration or device access.

In step 903, the routine invokes the loaded component driver to process the selected device control block. In processing the device control block, the component driver determines whether it should be included as a layer in the device driver based on the device-type information in the device control block and the configuration requirements in the call-down table. This process is described in FIG. 10. If the component driver determines it should be included, the component driver links into the call-down table. In step 904, the routine selects the next device control block. In step 905, if all device control blocks have been processed by the loaded component driver, then the routine continues at step 906, else the routine continues to step 903. In step 906, the routine loads the component driver pointed to by the previous entry in the load table. In step 907, if all component drivers pointed to by the load table have been processed, then the routine returns, else the routine loops to step 902.

Figure 10:
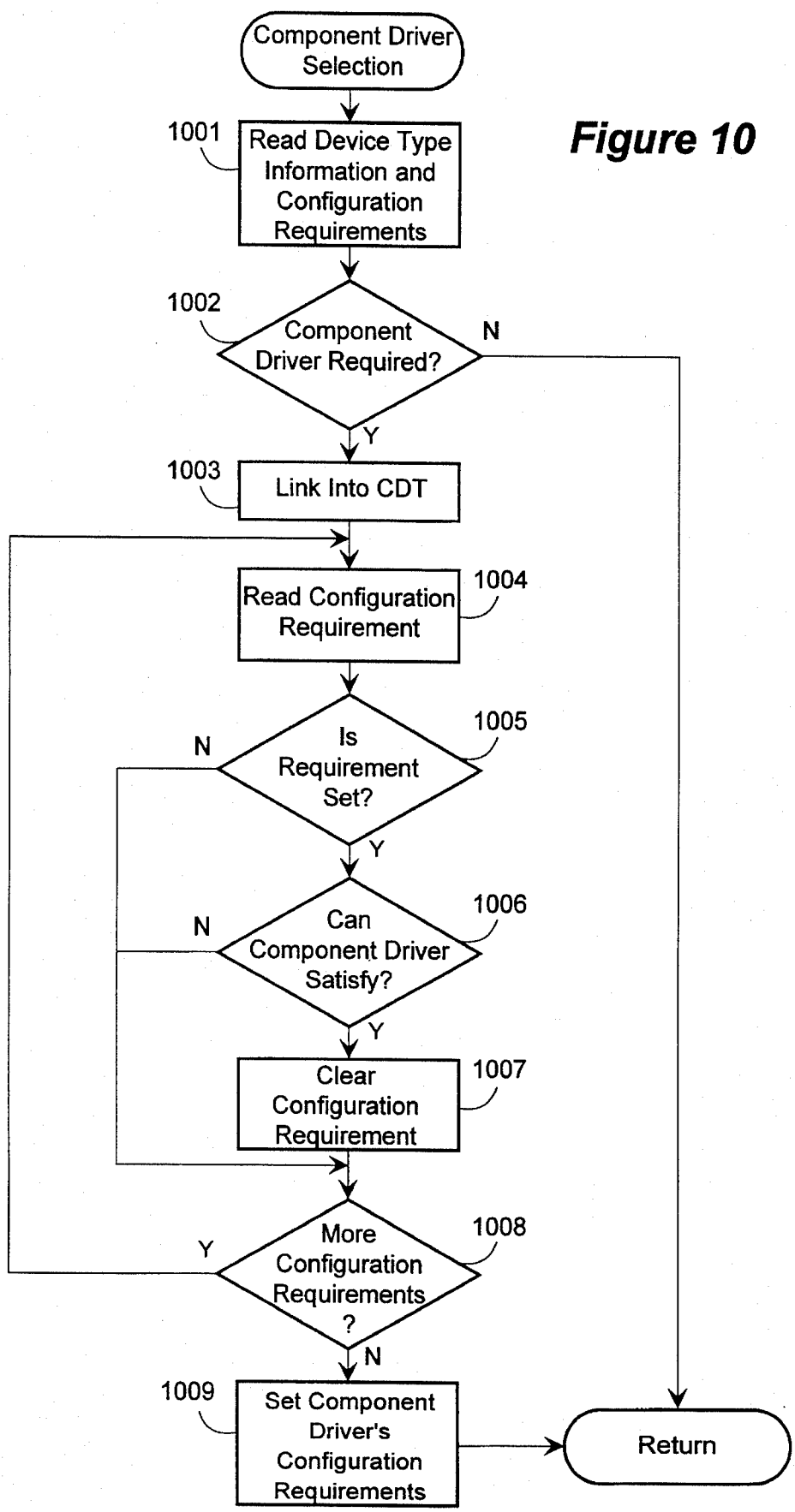
FIG. 10 is a flow diagram of a component driver selection routine.

FIG. 10 is a flow diagram of the component driver selection routine invoked during configuration routine (e.g. at step 903) to determine whether the invoking component driver should be included as a layer in the device driver. In steps 1001 and 1002, the component driver selection routine reads the device-type information and configuration requirements to determine whether the invoked component driver is to be linked into the call-down table. In a preferred embodiment, the routine reads all demand bits in the current topmost call-down table entry and reads the device-type entry in the device control block. If the device-type entry or any configuration requirements represented by the demand bits indicate that the component driver is to be included in the device driver, the routine links the component driver into the call-down table in step 1003 by pushing a new call-down table entry onto the top of the call-down table, initially having the same demand bits as the previously topmost call-down table entry. For example, if the device-type entry indicates that the device is a disk, a disk-specific component driver would be linked into the call-down table. If the component driver is not required, the routine returns.

In steps 1004 through 1008, the routine examines each configuration requirement to determine whether the component driver can satisfy the requirement. In steps 1004 and 1005, the routine reads a configuration bit to determine whether a corresponding demand is required. In a preferred embodiment, the routine reads a demand bit, such as 802 in FIG. 8, and determines whether the demand bit is set to "1" to indicate that a corresponding demand is required. In steps 1006 and 1007, the routine determines whether the component driver can satisfy the demand and, if so, clears the configuration requirement. In the preferred embodiment, the routine clears the appropriate demand bit in the new call-down table entry to "0". For example, if the configuration requirement indicates that physical memory addressing is required (e.g. for Direct Memory Access), a component driver capable of converting between logical memory addresses (e.g. segment selector and offset) and physical memory addresses would clear the appropriate demand bit to "0". In step 1008, if all the demand bits have been checked, then the routine continues at 1009, else the routine continues at 1004.

In step 1009, the routine in the new call-down table entry sets any configuration requirements of the component driver which must be satisfied by component drivers yet to be included in the device driver in order for the device driver to be configured correctly. For example, a disk caching component driver would set a physical disk address requirement. The routine then stores the configuration requirements in the new topmost call-down table entry corresponding to the newly included component driver. The remaining set of configuration requirements stored in the topmost entry now represents requirements imposed by lower level component drivers that are not yet satisfied and new requirements imposed by the newly included component driver.

Figure 11A:
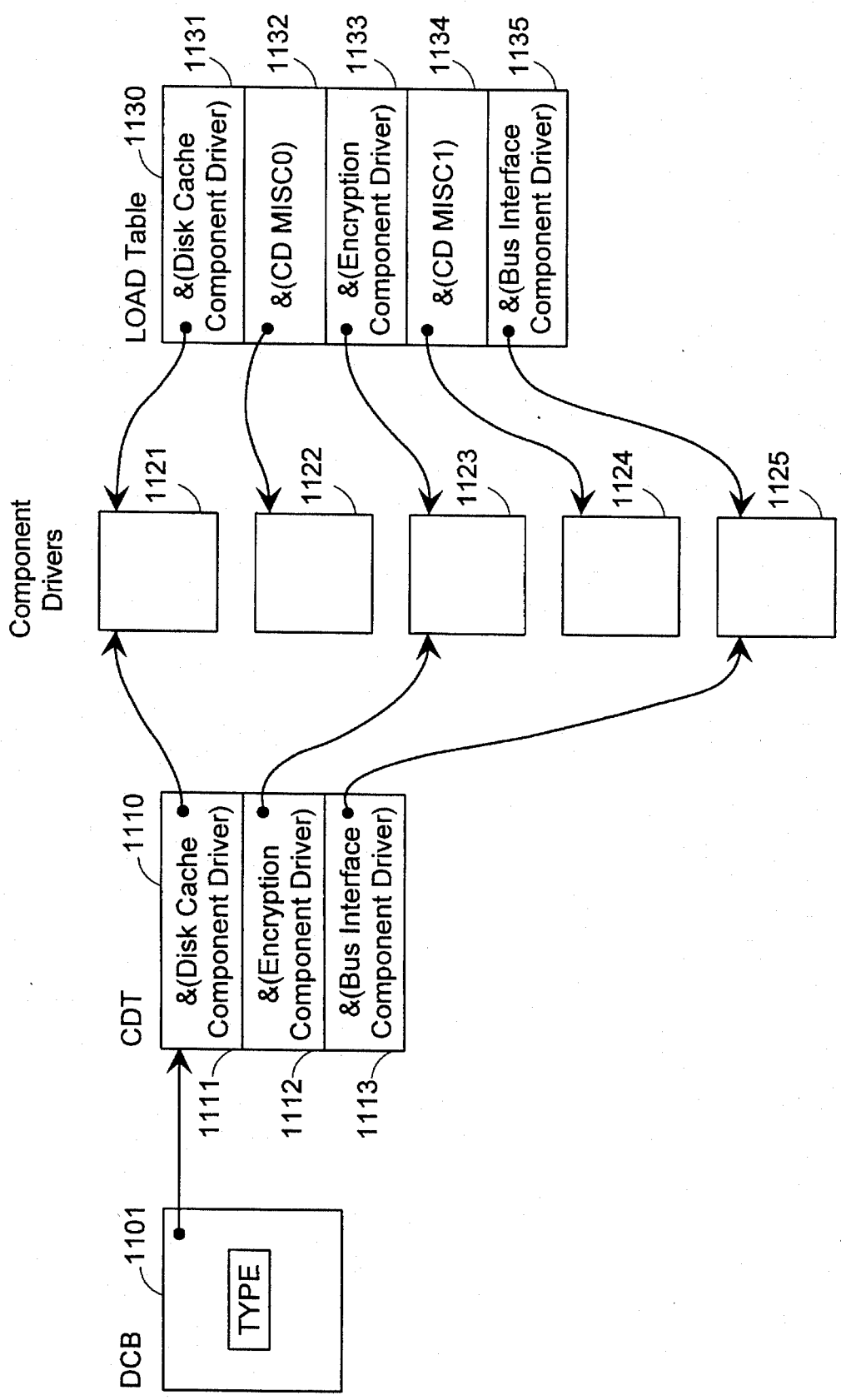
FIGS. 11A and 11B are block diagrams illustrating sample configurations of various device drivers.
Figure 11B:
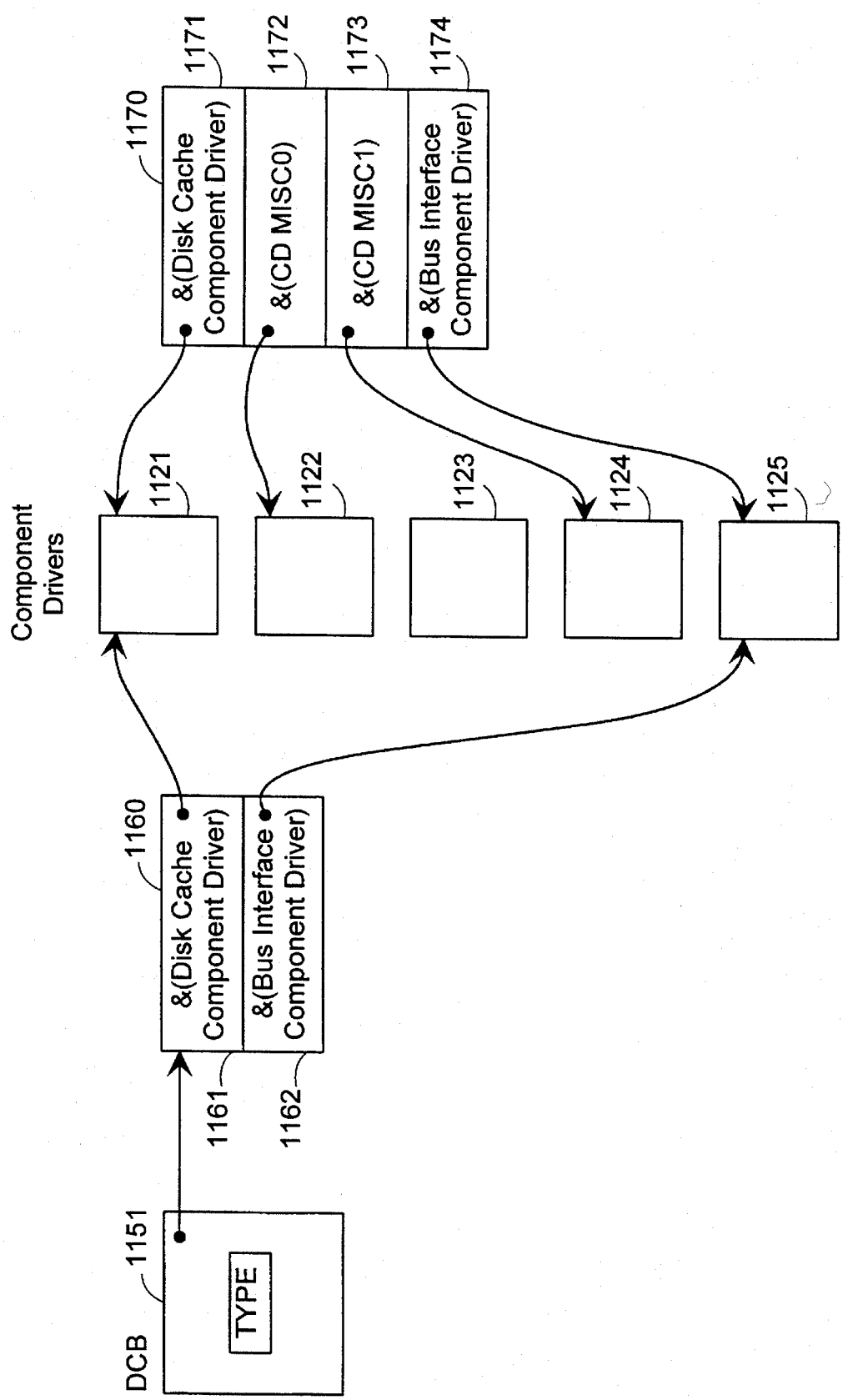

FIGS. 11A and 11B are block diagrams illustrating differently configured device drivers obtainable by the present invention through variable inclusion of component drivers in the load table. In this example, sample configurations of various disk device drivers are shown. In FIG. 11A, the device driver provides disk caching and data encryption. In FIG. 11B, the device driver provides disk caching but not data encryption. At computer startup, the load table 1130 contains a pointer 1131 to disk cache component driver 1121, a pointer 1132 to a miscellaneous component driver 1122, a pointer 1133 to a data encryption component driver 1123, a pointer 1134 to a miscellaneous component driver 1124, and a pointer 1135 to a disk component driver 1125. The configuration routine invokes each component driver pointed to by the load table, passing it the device control block 1101 for the disk drive. Each component driver determines whether it should be part of the disk device driver and, if so, loads a pointer to itself into the call-down table 1110. After configuration of the disk drive device is complete, the call-down table 1110 contains a pointer 1111 to the disk cache component driver 1121, a pointer 1112 to the data encryption driver 1123, and a pointer 1113 to the disk component driver 1125. In this example, the miscellaneous component drivers 1122 and 1124 determined that they should not be part of the disk drive device driver.

FIG. 11B illustrates how the disk device driver can be configured without the data encryption component driver. The load table 1170 contains the same data as load table 1130 except it no longer contains a pointer to the data encryption component driver 1123. At system startup, the device driver configuration routine loads each component driver that is in load table 1170. Since the data encryption component driver is not pointed to by the load table 1170, a pointer to it is not loaded into the call-down table 1160. Thus, an end user can control the configuration of the device drivers by modifying the load table.

Figures 12A, 12B:
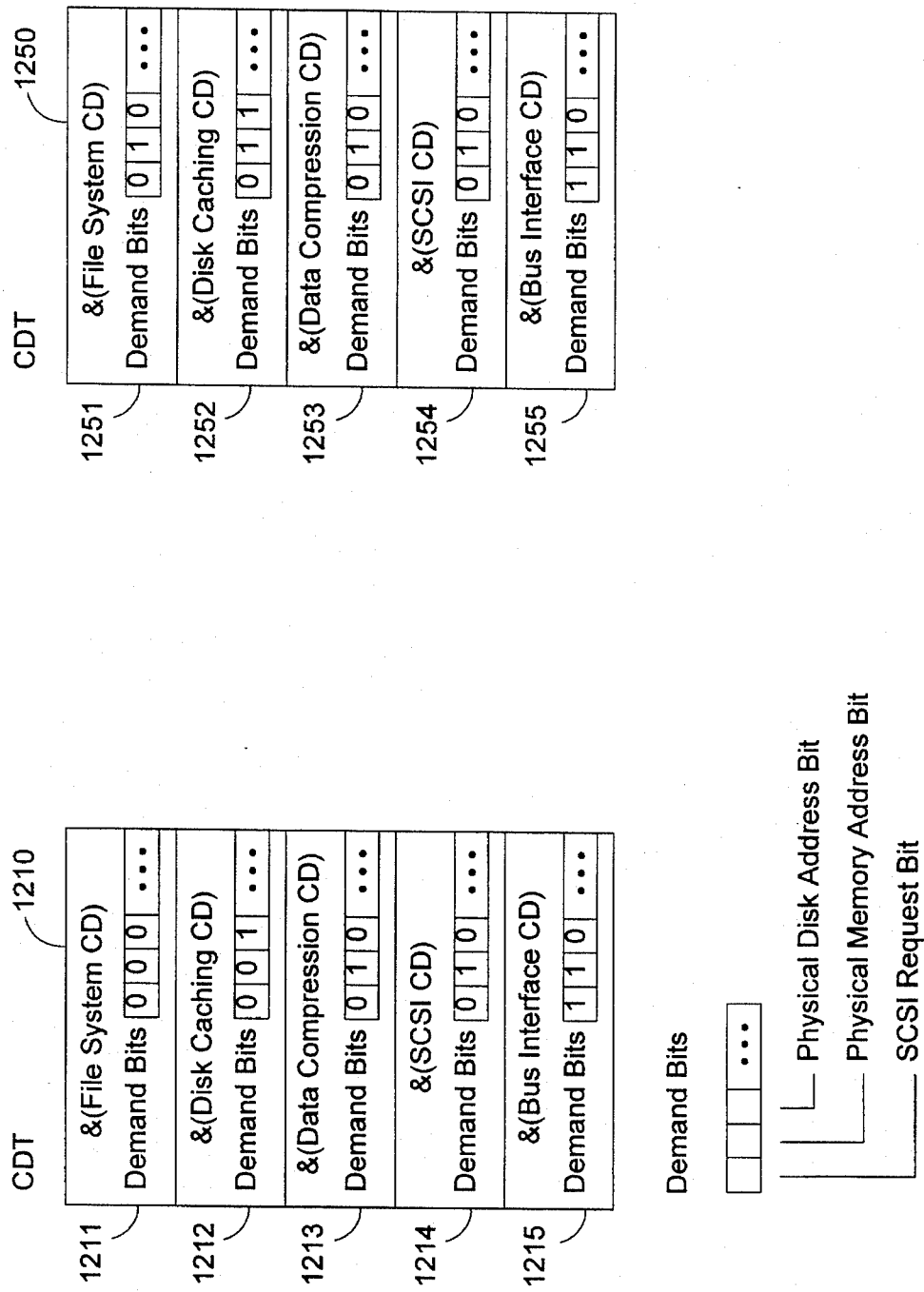
FIGS. 12A and 12B are block diagrams showing the contents of the call-down table corresponding to different configurations of a device driver.

FIGS. 12A and 12B, respectively, illustrate a successful and unsuccessful configuration of a device driver based on satisfying and not satisfying the configuration requirements. In this example, sample configurations of various disk device drivers are shown. In each case, the device driver is configured to include a file system component driver, a disk caching component driver, a data compression component driver, an SCSI (Small Computer Systems Interface) component driver, and a bus interface component driver. The SCSI component driver performs device driver processing specific to the SCSI standard. The bus interface component driver performs device driver processing specific to a particular adapter, such as a SCSI adapter. The demand bits include an SCSI request bit, a physical memory address bit, and a physical disk address bit as the first three bit positions in the demand bit entry. Although these demand bits are used as examples, one of ordinary skill will readily understand that other demand bits can be provided which represent various requirements, such as logical or physical disk addressing, logical or physical memory addressing, alignment requirements, etc.

FIG. 12A shows a call-down table 1201 having call-down table entries 1211, 1212, 1213, 1214 and 1215 each with a pointer to a corresponding component driver and each with a set of demand bits. These demand bits indicate configuration requirements of the corresponding component driver and presently unsatisfied configuration requirements of lower layer component drivers. In configuring the device driver represented by call-down table 1210, the configuration routine (FIG. 9) invokes a bus interface component driver which communicates directly with the disk drive. The bus interface component driver is, for example, a SCSI BID (Bus Interface Driver). The bus interface component driver selects to be included in the call-down table. The call-down table entry 1215 includes a pointer to the bus interface component driver and demand bits indicating the configuration requirements of the bus interface component driver. In this case, because the bus interface component driver is a SCSI BID, it sets the SCSI request bit to "1", so that it can interface with an application program requesting I/O using the SCSI standard interface.

The bus interface component driver also sets the physical memory address bit so that I/O can take place with the disk with reference to actual physical memory locations in the computer memory (e.g. when data is transferred to the disk using DMA). This requires that some component driver of the device driver translate between logical memory addresses provided by an application program and physical memory addresses. For example, in an 80386 microprocessor architecture, applications refer to using a logical address consisting of a segment selector and a segment offset. In order to access the actual physical memory location of the data, the logical address is first converted to a linear address which describes the address with a single binary value. The linear address is then translated to a physical address based on a page table which maps the linear address to a physical address location. Thus, both the SCSI request bit and physical memory address bit are set, and the first three demand bits are "110" as shown by the demand bits entry 1215.

Because the SCSI request bit is set to "1", a SCSI component driver selects to be included in the device driver when invoked by the configuration routine. For example, if a SCSI component driver can satisfy the SCSI requirement indicated by the SCSI request bit, it is selected as a component driver, clears the SCSI request bit to "0", and stores the demand bits "010" in the first three bit positions of its entry 1214. The SCSI component driver has no requirements of its own as no new demand bits are set.

Next, a data compression component driver selects itself, based on an appropriate demand bit or device-type entry, by linking into the call-down table 1210 with call-down table entry 1213. Because the data compression component driver does not satisfy the physical memory address requirement, and imposes no new requirements, it stores the same first three demand bits "010" in its entry 1213 in the call-down table 1210.

Next, a disk caching component driver selects to be included in the call-down table by linking entry 1212 into the call-down table 1210. The disk caching component driver is included, for example, because of the disk device-type indicated in the device control block. In this example, the disk caching component driver represented by the call-down table entry 1212 can satisfy the physical memory address requirement, and thus clears the physical memory demand bit to "0". Because the disk caching component driver uses physical disk addresses when caching the disk data, it also sets the physical disk address bit to "1". Thus, the routine stores "001" as the first three demand bits in entry 1212.

Finally, a file system component driver selects to be included in the device driver by linking the file system component driver entry 1211 into the call-down table 1210. The file system component driver is included because of the disk type entry in the data control block, and performs translation between logical disk addresses (file names) and physical disk addresses indicating the actual physical disk addresses of files. Because the file system component driver can provide physical disk addresses, it clears the physical disk address bit to "0" and stores "000" as the first three demand bits in the topmost call-down table entry 1211.

The device driver represented by the call-down table 1210 is thus configured so that, upon an I/O access request, the component drivers 1211, 1212, 1213, 1214, and 1215, will be invoked, beginning with the file system component driver 1211 and continuing to the bus interface component driver 1215. Assuming all other demand bits (not shown) in the topmost entry of the call down table 1210 are also "0", all configuration requirements are assured to have been satisfied during configuration (see FIG. 5, step 503). Thus, access to the disk will be allowed and the component drivers will be invoked to perform their individual function in performing the I/O request.

FIG. 12B shows a call-down table 1250 in which I/O access to the disk would not be allowed because not all the configuration requirements are satisfied. In the device driver represented by the call-down table 1250, all of the same component drivers are included as in FIG. 12A, except that the disk caching component driver does not provide physical memory address translation. As such, the bus interface component driver entry 1255, SCSI component driver entry 1254, and data compression component driver entry 1253 are linked into the call-down table and set and clear the same demand bits as the component driver entries 1215, 1214 and 1213 in the previous example. The disk caching component driver entry 1252, however, does not clear the physical memory address bit and thus stores "011" as the first three demand bits instead of the "001" stored in entry 1212. Thus, when the file system component driver clears the physical address bit in the topmost call-down table entry 1251, the physical memory address bit remains set, the first three demand bits being "010". Thus, when an I/O access to the disk is requested of the device driver configured in accordance with the call-down table 1250, the access will not be allowed because all bits in the topmost entry of the call-down table have not been cleared.

Thus, the present invention flexibly configures a device driver to include necessary or enhancing component drivers. The component drivers can potentially be from different sources and can be shared by any number of device drivers. Further, the device driver is configured so that each component driver may be selected based on configuration requirements of lower layer component drivers and can impose its own configuration requirements on component drivers yet to be included. Because each component driver clears configuration requirements that it can satisfy, access to a device is not allowed unless all such configuration requirements are met during configuration of the device driver. Thus, when configuration occurs successfully for only a portion of the device drivers, access to the devices corresponding to those drivers remains possible while access to the other device drivers can be separately denied.

Although the present invention has been described in terms of a preferred embodiment, it is not intended that the invention be limited to these embodiments. Modifications within the spirit of the invention will be apparent to those skilled in the art. The scope of the present invention is defined in the claims which follow.

We claim:

1. A method in a computer system for configuring a device driver from a plurality of component drivers by determining whether each of the plurality of component drivers should be included in the device driver, the method comprising the computer-implemented steps of:

for each selected one of the plurality of component drivers,
determining configuration requirements imposed by each of the component drivers that is already included in the device driver;
determining whether the selected component driver satisfies at least one of the determined configuration requirements imposed by the component drivers that are already included in the device driver; and
when the selected component driver satisfies at least one of the determined configuration requirements, including the selected component driver in the device driver.

2. The method of claim 1, wherein the step of determining whether the selected component driver satisfies at least one of the determined configuration requirements includes the step of invoking the selected component driver and having the invoked selected component driver determine whether the invoked selected component driver satisfies one of the determined configuration requirements.

3. The method of claim 2 wherein the step of including the selected component driver in the device driver includes the step of, when the invoked selected component driver satisfies at least one of the determined configuration requirements, the invoked selected component driver include the invoked selected component driver in the device driver.

4. The method of claim 1,
wherein the step of including the selected component driver in the device driver includes the step of including the selected component driver as a layer in the device driver;
wherein a first of the component drivers that is included in the device driver comprises a bottom layer of the device driver;
wherein each additional one of the component drivers that is included in the device driver comprises a higher layer of the device driver; and
wherein a last of the component drivers that is included in the device driver comprises a top layer of the device driver.

5. A method in a computer system for configuring and executing a device driver, the device driver being configured from a plurality of component drivers by determining whether each of the plurality of component drivers should be included in the device driver, each of the plurality of component drivers performing a function, the method comprising the computer-implemented steps of:
for each selected one of the plurality of component drivers,
determining configuration requirements imposed by each of the component drivers that is already included in the device driver;
determining whether the selected component driver satisfies at least one of the determined configuration requirements imposed by the component drivers that are already included in the device driver; and
when the selected component driver satisfies at least one of the determined configuration requirements, including the selected component driver in the device driver; and
invoking and performing the function of each component driver that is part of the device driver.

6. The method of claim 5,
wherein the step of determining whether the selected component driver satisfies at least one of the determined configuration requirements includes the step of invoking the selected component driver and having the invoked selected component driver determine whether the invoked selected component driver satisfies at least one of the determined configuration requirements; and
wherein the step of including the selected component driver in the device driver includes the step of, when the invoked selected component driver satisfies at least one of the determined configuration requirements, having the invoked selected component driver include the invoked selected component driver in the device driver.

7. The method of claim 5,
wherein the step of including the selected component driver in the device driver includes the step of including the selected component driver as a layer in the device driver;
wherein a first one of the component drivers that is included in the device driver comprises a bottom layer of the device driver;
wherein each additional one of the component drivers that is included in the device driver comprises a higher layer of the device driver; and
wherein a last of the component drivers that is included in the device driver comprises a top layer of the device driver.

8. The method of claim 7, wherein each component driver included in the device driver invokes the next lower layer component driver until the bottom layer component driver has been invoked.

9. A computer system for configuring a device driver from a plurality of component drivers by determining whether each selected one of the plurality of component drivers should be included in the device driver, the computer system comprising:
a plurality of component drivers;
a component driver selection routine for performing the following steps for each selected component driver:
determining configuration requirements imposed by each of the component drivers that is already included in the device driver;
determining whether the selected component driver satisfies one of the determined configuration requirements; and
when the selected component driver satisfies at least one of the determined configuration requirements, including the component driver in the device driver.

10. The method of claim 1, further including the step of, for each given component driver included in the device driver, indicating the configuration requirements of any component driver that is already included in the device driver that the given component driver satisfies.

11. The method of claim 1, further including the step of, for each component driver included in the device driver, indicating any configuration requirements that the component driver must have satisfied by another component driver included in the device driver.

12. The method of claim 5, further including the step of, for each component driver included in the device driver, indicating the configuration requirements imposed by any component driver that is already included in the device driver that the component driver satisfies.

13. The method of claim 5, further including the step of, for each component driver included in the device driver, indicating any configuration requirements that the component driver must have satisfied by another component driver included in the device driver.

14. A method in a computer system for configuring a device driver from a plurality of component drivers by determining whether each of the plurality of component drivers should be included in the device driver, the device driver corresponding to a device, the method comprising the computer-implemented steps of:
determining a type of the device; and
for each selected one of the plurality of component drivers,
determining configuration requirements imposed by each of the component drivers that is already included in the device driver and not satisfied by any other of the component drivers that are already included in the device driver;

determining whether the selected component driver should be included in the device driver based on the determined type of the device and the determined configuration requirements; and including the selected component driver in the device driver when the selected component driver relates to the determined type of the device or when the selected component driver satisfies any of the determined configuration requirements.

15. The method of claim 14, further including the step of invoking each of the plurality of component drivers;

wherein the step of determining configuration requirements includes the step of having the invoked selected component driver determine configuration requirements imposed by each of the component drivers that is already included in the device driver and not satisfied by any other of the component drivers that are already included in the device driver;

wherein the step of determining whether the selected component driver should be included in the device driver includes the step of having the invoked selected component driver determine whether the invoked selected component driver should be included in the device driver based on the determined type of the device and the determined configuration requirements; and wherein the step of including the selected component driver in the device driver includes the step of having the invoked selected component driver include the invoked component driver in the device driver when the invoked selected component driver relates to the determined type of the device or when the invoked selected component driver satisfies any of the determined configuration requirements.

16. The method of claim 14, further including the step of, for each given one of the component drivers that is included in the device driver, indicating the configuration requirements of any of the component drivers that are already included in the device driver that the given component driver satisfies.

17. The method of claim 14, further including the step of, for each given one of the component drivers that is included in the device driver, indicating any configuration requirements that the given component driver must have satisfied by another one of the component drivers that is included in the device driver.

18. The method of claim 14, wherein the step of including the component driver in the device driver includes the step of including the component driver as a layer in the device driver;

wherein a first of the component drivers that is included in the device driver comprises a bottom layer of the device driver;

wherein each additional of the component drivers that is included in the device driver comprises a higher layer of the device driver; and wherein a last of the component drivers that is included in the device driver comprises a top layer of the device driver.

19. The method of claim 18, further including the steps of, for each given one of the component drivers that is included in the device driver, indicating the configuration requirements of ones of the component drivers, that are at lower layers of the device driver than the given component driver, that the given component driver satisfies; and indicating any configuration requirements that the given component driver must have satisfied by ones of the component drivers that are at higher layers of the device driver than the given component driver.

20. A method in a computer system for executing a device driver, the device driver being configured from a plurality of component drivers, the component drivers imposing configuration requirements, each of the plurality of component drivers performing a function, at least one component driver being included in the device driver, the method comprising the computer-implemented steps of:

determining whether the configuration requirements imposed by each component driver included in the device driver have been satisfied; and when the configuration requirements have been satisfied, invoking and performing the function of each of the component drivers that is included in the device driver.

21. A method in a computer system for executing a device driver, the device driver being configured from a plurality of component drivers, the component drivers imposing configuration requirements, each of the plurality of component drivers performing a function, at least two component drivers being part of the device driver, the component drivers comprising layers in the device driver, a first of the component drivers that is included in the device driver comprising a bottom layer, each additional one of the component drivers that is included in the device driver comprising a higher layer, and a last of the component drivers that is included in the device driver comprising a top layer, the method comprising the computer-implemented steps of:

determining whether the configuration requirements imposed by each of the component drivers that is included in the device driver have been satisfied; and when the configuration requirements have been satisfied, for each given one of component drivers that is included in the device driver starting with the component driver at the top layer of the device driver, invoking the given component driver; and performing the function of the given component driver.

22. The method of claim 21 wherein each of the component drivers that is included in the device driver invokes one of the component drivers at a next lower layer in the device driver until the component driver at the bottom layer of the device driver has been invoked.

23. A method in a computer system for configuring and executing a device driver, the device driver being configured from a plurality of component drivers by determining whether each of the plurality of component drivers should be included in the device driver, each of the plurality of component drivers performing a function, the device driver corresponding to a device, the method comprising the computer-implemented steps of:

determining a type of the device;

for each selected one of the plurality of component drivers, determining configuration requirements imposed by each of the component drivers that is already included in the device driver and not satisfied by any other of the component drivers that are already included in the device driver;

determining whether the selected component driver should be included in the device driver based on the determined type of the device and the determined configuration requirements; and including the selected component driver in the device driver when the selected component driver relates to the determined type of the device or when the selected component driver satisfies any of the determined configuration requirements;

determining whether the configuration requirements imposed by each of the component drivers that is included in the device driver have been satisfied; and when the configuration requirements have been satisfied, invoking and performing the function of each of the component drivers that is included in the device driver.

24. The method of claim 23, further including the step of invoking each selected one of the plurality of component drivers to determine whether the selected component driver should be included in the device driver;

wherein the step of determining configuration requirements includes the step of having the invoked selected component driver determine configuration requirements imposed by each of the component drivers that is already included in the device driver and not satisfied by any other ones of the component drivers that are already included in the device driver;

wherein the step of determining whether the selected component driver should be included in the device driver includes the step of having the invoked selected component driver determine whether the invoked component selected driver should be included in the device driver based on the determined type of the device and the determined configuration requirements; and wherein the step of including the selected component driver part of the device driver includes the step of having the invoked selected component driver include the invoked selected component driver in the device driver when the invoked selected component driver relates to the determined type of the device or when the invoked selected component driver satisfies any of the determined configuration requirements.

25. The method of claim 23, further including the step of, for each given one of the component drivers that is included in the device driver, indicating the configuration requirements imposed by any of the component drivers that are already included in the device driver that the given component driver satisfies.

26. The method of claim 23, further including the step of, for each given one of the component drivers that is included in the device driver, indicating any configuration requirements that the given component driver must have satisfied by another of the component drivers that is included in the device driver.

27. The method of claim 23, wherein the step of making the selected component driver part of the device driver includes the step of including the selected component driver as a layer in the device driver;

wherein a first of the component drivers that is included in the device driver comprises a bottom layer of the device driver;

wherein each additional one of the component drivers that is included in the device driver comprises a higher layer of the device driver; and wherein a last of the component drivers that is included in the device driver comprises a top layer of the device driver.

28. The method of claim 27, further including the steps of, for each given one of the component drivers that is included in the device driver, indicating the configuration requirements of ones of the component drivers, at layers of the device driver that are lower than the layer of the given component driver, that the component driver satisfies; and indicating any configuration requirements that the given component driver must have satisfied by component drivers at layers in the device driver that are higher than the layer of the given component driver.

29. The method of claim 27 wherein the step of, for each given one of the component drivers that are included in the device driver, invoking the component driver includes the step of, for each given one of the component drivers that is included in the device drivers, starting with the component driver at the top layer of the device driver, invoking the given component driver.

30. The method of claim 29 wherein each component driver included in the device driver invokes the component driver at the next lower layer of the device driver until the component driver at the bottom layer has been invoked.

31. A computer system comprising:

a device;

a device driver for the device;

a plurality of component drivers tier possible incorporation into the device driver; and a component driver selection routine for determining whether each selected one of the component drivers should be made part of the device driver, said routine performing the steps of:

determining the type of the device;

determining configuration requirements imposed by each of the component drivers that is already included in the device driver and not satisfied by any other of the component drivers that are already included in the device driver;

determining whether the selected component driver should be included in the device driver based on the determined type of the device and the determined configuration requirements; and including the selected component driver in the device driver when the selected component driver relates to the determined type of the device or when the selected component driver satisfies any of the determined configuration requirements.

32. The computer system of claim 31, further comprising a device driver configuration routine for invoking each of the plurality of component drivers so that each invoked component driver can execute the component driver selection routine.

33. A computer system for executing a device driver, the device driver being configured from a plurality of component drivers, the component drivers imposing configuration requirements, each of the plurality of component drivers performing a function, the system comprising:

at least one of the component drivers being included in the device driver for performing the component driver function; and an input-output system for:

determining whether the configuration requirements imposed by each of the component drivers that is included in the device driver have been satisfied; and when the configuration requirements have been satisfied, for each given one of the component drivers that is included in the device driver, invoking the given component driver.

34. A method in a computer system for configuring a computer module from a plurality of component routines by determining whether each of the plurality of component routines should be included in the computer module, the method comprising the computer-implemented steps of:

for each selected one of the plurality of component routines, determining configuration requirements imposed by each of the component routines that is already included in the computer module;

determining whether the selected component routine satisfies a determined configuration requirement; and when the selected component routine satisfies one of the determined configuration requirements, including the component routine in the computer module.

35. The method of claim 34 wherein the step of determining whether the selected component routine satisfies one of the determined configuration requirements includes the step of invoking the selected component routine and having the invoked selected component routine determine whether the invoked selected component routine satisfies one of the determined configuration requirements.

36. The method of claim 35 wherein the step of including the component routine in the computer module includes the step of, when the invoked selected component routine satisfies one of the determined configuration requirements, having the invoked selected component routine include the invoked selected component routine in the computer module.

37. The method of claim 34, wherein the step of including the selected component routine in the computer module includes the step of including the selected component routine as a layer in the computer module;

wherein a first of the component routines that is included in the computer module comprises a bottom layer of the computer module;

wherein each additional one of the component routines that is included in the computer module comprises a higher layer of the computer module; and wherein a last of the component routines that is included in the computer module comprises a top layer of the computer module.

38. A method in a computer system for configuring and executing a computer program, the computer program being configured from a plurality of component programs by determining whether each of the plurality of component programs should be included in the computer program, each of the plurality of component programs performing a function, the method comprising the computer-implemented steps of:

for each selected one of the plurality of component programs, determining configuration requirements imposed by each of the component programs that is already included in the computer program;

determining whether the selected component program satisfies any of the determined configuration requirements; and when the selected component program satisfies at least one of the determined configuration requirements, including the selected component program in the computer program; and invoking and performing the function of each selected component program that are included in the computer program.

39. The method of claim 38, wherein the step of determining whether the selected component program satisfies one of the determined configuration requirements includes the step of invoking the selected component program and having the invoked selected component program determine whether the invoked selected component program satisfies at least one of the determined configuration requirements; and wherein the step of including the selected component program in the computer program includes the step of, when the invoked selected component program satisfies one of the determined configuration requirements, having the invoked selected component program include the invoked selected component program in the computer program.

40. The method of claim 38, wherein the step of including the selected component program in the computer program includes the step of including the selected component program as a layer in the computer program;

wherein a first of the component programs that is included in the computer program comprises a bottom layer of the computer program;

wherein each additional one of the component programs that is included in the computer program comprises a higher layer of the computer program; and wherein a last of the component programs that is included in the computer program comprises a top layer of the computer program.

41. A computer system for configuring a computer module from a plurality of component routines by determining whether each of the plurality of component routines should be included in the computer module, the computer system comprising:

a plurality of component routines;

a component routine selector for performing the following steps for each of selected one of the component routines:

determining configuration requirements imposed by each of the component routines that is already included in the computer module;

determining whether the selected component routine satisfies at least one of the determined configuration requirements; and when the selected component routine satisfies one of the determined configuration requirements, including the selected component routine in the computer module.

* * * * *

UNITED STATES PATENT AND TRADEMARK OFFICE
CERTIFICATE OF CORRECTION

PATENT NO. : 5,613,123
DATED : March 18, 1997
INVENTOR(S) : Michael Hin-Cheung Tsang and Andrew P. R. Crick It is certified that error appears in the above-indentified patent and that said Letters Patent is hereby corrected as shown below:

In column 18, claim 31, line 4, please delete "tier" and insert therefor --for--.

Signed and Sealed this

Nineteenth Day of August, 1997

Attest:

BRUCE LEHMAN

*Attesting Officer*       *Commissioner of Patents and Trademarks*